(12) United States Patent
Lair et al.

(10) Patent No.: US 8,127,530 B2
(45) Date of Patent: Mar. 6, 2012

(54) THRUST REVERSER FOR A TURBOFAN GAS TURBINE ENGINE

(75) Inventors: Jean-Pierre Lair, San Antonio, TX (US); Paul Weaver, Chateauguay (CA)

(73) Assignee: The NORDAM Group, Inc., Tulsa, OK (US)

( * ) Notice: Subject to any disclaimer, the term of this patent is extended or adjusted under 35 U.S.C. 154(b) by 824 days.

(21) Appl. No.: 12/142,084

(22) Filed: Jun. 19, 2008

(65) Prior Publication Data

US 2009/0313969 A1    Dec. 24, 2009

(51) Int. Cl.
F02K 3/02 (2006.01)
F02K 1/54 (2006.01)
B05B 12/00 (2006.01)

(52) U.S. Cl. ............... 60/226.2; 239/265.33; 244/110 B

(58) Field of Classification Search .............. 60/226.2, 60/230; 239/265.25, 265.33; 244/110 B
See application file for complete search history.

(56) References Cited

U.S. PATENT DOCUMENTS

| | | |
|---|---|---|
| 2,847,823 A | 8/1958 | Brewer |
| 3,347,578 A | 10/1967 | Sheehan et al. |
| 3,492,821 A | 2/1970 | Monaghan et al. |
| 3,532,275 A | 10/1970 | Horn et al. |
| 3,541,794 A | 11/1970 | Johnston et al. |
| 3,550,855 A | 12/1970 | Feld et al. |
| 3,610,534 A | 10/1971 | Medawar |
| 3,640,468 A | 2/1972 | Searle et al. |
| 3,660,982 A | 5/1972 | Gozlan |
| 3,684,182 A | 8/1972 | Maison |
| 3,856,239 A | 12/1974 | Leibach |
| 4,047,381 A | 9/1977 | Smith |
| 4,129,269 A | 12/1978 | Fage |
| 4,175,385 A | 11/1979 | Nash |
| 4,182,501 A | 1/1980 | Fage |
| 4,194,692 A * | 3/1980 | Dickenson ............... 239/265.39 |
| 4,212,442 A | 7/1980 | Fage |
| 4,232,516 A | 11/1980 | Lewis et al. |
| 4,292,803 A | 10/1981 | Prior |
| 4,362,015 A | 12/1982 | Fage |
| 4,422,605 A | 12/1983 | Fage |
| 4,424,669 A | 1/1984 | Fage |
| 4,519,561 A | 5/1985 | Timms |
| 4,581,890 A | 4/1986 | Giraud |
| 4,682,733 A | 7/1987 | Newton |
| 4,801,112 A | 1/1989 | Fournier |
| 4,830,519 A | 5/1989 | Starke |
| 4,836,451 A | 6/1989 | Herrick et al. |

(Continued)

FOREIGN PATENT DOCUMENTS

FR    2601077    1/1988

(Continued)

OTHER PUBLICATIONS

U.S. Appl. No. 11/941,378, filed Nov. 16, 2007, entitled "Thrust Reverser for a Turbofan Gas Turbine Engine", by Jean-Pierre Lair.

(Continued)

Primary Examiner — Ehud Gartenberg
Assistant Examiner — Arun Goyal
(74) Attorney, Agent, or Firm — Francis L. Conte

(57) ABSTRACT

The thrust reverser comprises sections, such as arms and skins, which may be connected along joints to provide a thrust reverser body. A plurality of fittings may be integrally formed on a surface of each arm.

25 Claims, 2 Drawing Sheets

U.S. PATENT DOCUMENTS

| | | |
|---|---|---|
| 4,860,956 A | 8/1989 | Fage |
| 4,865,256 A | 9/1989 | Durand |
| 4,894,985 A | 1/1990 | Dubois |
| 4,909,346 A | 3/1990 | Torkelson |
| 4,914,905 A | 4/1990 | Dubois |
| 4,916,895 A | 4/1990 | Dubois |
| 4,922,712 A | 5/1990 | Matta |
| 4,922,713 A | 5/1990 | Barbarin |
| 4,960,243 A | 10/1990 | Dubois |
| 4,966,327 A | 10/1990 | Fage et al. |
| 4,976,466 A | 12/1990 | Vauchel |
| 4,998,409 A | 3/1991 | Mutch |
| 5,003,770 A | 4/1991 | Schegerin |
| 5,039,171 A | 8/1991 | Lore |
| 5,040,730 A | 8/1991 | Hogie |
| 5,083,426 A | 1/1992 | Layland |
| 5,090,197 A | 2/1992 | Dubois |
| 5,097,661 A | 3/1992 | Lair et al. |
| 5,101,621 A | 4/1992 | Mutch |
| 5,117,630 A | 6/1992 | Cariola |
| 5,120,004 A | 6/1992 | Matthias |
| 5,167,118 A | 12/1992 | Torkelson |
| 5,176,340 A | 1/1993 | Lair |
| 5,181,676 A | 1/1993 | Lair |
| 5,192,023 A | 3/1993 | Fage et al. |
| 5,197,693 A | 3/1993 | Remlaoui |
| 5,203,525 A | 4/1993 | Remlaoui |
| 5,209,057 A | 5/1993 | Remlaoui |
| 5,211,008 A | 5/1993 | Fage |
| 5,221,048 A | 6/1993 | Lair |
| 5,224,342 A | 7/1993 | Lair |
| 5,228,641 A | 7/1993 | Remlaoui |
| 5,230,213 A | 7/1993 | Lawson |
| 5,243,817 A | 9/1993 | Matthias |
| 5,251,435 A | 10/1993 | Pauley |
| 5,267,438 A | 12/1993 | Bunel |
| 5,284,015 A | 2/1994 | Carimali |
| 5,297,387 A | 3/1994 | Carimali |
| 5,309,711 A | 5/1994 | Matthias |
| 5,310,117 A | 5/1994 | Fage et al. |
| 5,347,808 A | 9/1994 | Standish |
| 5,372,006 A | 12/1994 | Lair |
| 5,390,879 A | 2/1995 | Lair |
| 5,392,991 A | 2/1995 | Gatti |
| 5,396,762 A | 3/1995 | Standish |
| 5,419,515 A | 5/1995 | Lair |
| 5,440,875 A | 8/1995 | Torkelson |
| 5,473,886 A | 12/1995 | Lebrun |
| 5,615,834 A | 4/1997 | Osman |
| 5,666,802 A | 9/1997 | Lair |
| 5,730,392 A | 3/1998 | Lair |
| 5,775,639 A * | 7/1998 | Fage .......... 244/110 B |
| 5,779,192 A | 7/1998 | Metezeau et al. |
| 5,826,823 A * | 10/1998 | Lymons et al. .......... 244/110 B |
| 6,027,071 A | 2/2000 | Lair |
| 6,029,439 A | 2/2000 | Gonidec |
| 6,032,901 A | 3/2000 | Carimali |
| 6,044,641 A | 4/2000 | Baudu |
| 6,045,091 A | 4/2000 | Baudu |
| 6,065,285 A | 5/2000 | Gonidec |
| 6,068,213 A | 5/2000 | Gonidec |
| 6,076,347 A | 6/2000 | Gonidec |
| 6,079,201 A | 6/2000 | Jean |
| 6,082,096 A | 7/2000 | Vauchel |
| 6,094,908 A | 8/2000 | Baudu |
| 6,101,807 A | 8/2000 | Gonidec |
| 6,105,439 A | 8/2000 | Roger |
| 6,145,301 A | 11/2000 | Gonidec |
| 6,145,786 A | 11/2000 | Baudu |
| 6,148,607 A | 11/2000 | Baudu |
| 6,151,884 A | 11/2000 | Gonidec |
| 6,151,885 A | 11/2000 | Metezeau |
| 6,151,886 A | 11/2000 | Vauchel |
| 6,158,211 A | 12/2000 | Gonidec |
| 6,170,254 B1 | 1/2001 | Cariola |
| 6,170,255 B1 | 1/2001 | Gonidec |
| 6,173,807 B1 | 1/2001 | Welch et al. |
| 6,216,980 B1 | 4/2001 | Baudu |
| 6,237,325 B1 | 5/2001 | Hogie |
| 6,256,979 B1 | 7/2001 | Fournier |
| 6,260,801 B1 | 7/2001 | Peters |
| 6,276,026 B1 | 8/2001 | Wille |
| 6,293,495 B1 | 9/2001 | Aten |
| 6,357,672 B1 | 3/2002 | Cowan et al. |
| 6,385,964 B2 | 5/2002 | Jean |
| 6,402,092 B1 | 6/2002 | Jean |
| 6,438,942 B2 | 8/2002 | Fournier |
| 6,487,845 B1 | 12/2002 | Modglin |
| 6,546,715 B1 | 4/2003 | Blevins |
| 6,546,716 B2 | 4/2003 | Lair |
| 6,568,172 B2 | 5/2003 | Jannetta et al. |
| 6,584,763 B2 | 7/2003 | Lymons |
| 6,592,074 B2 | 7/2003 | Dehu |
| 6,622,964 B2 | 9/2003 | Rouyer |
| 6,688,098 B2 | 2/2004 | Rouyer |
| 6,688,099 B2 | 2/2004 | Lair |
| 6,751,944 B2 | 6/2004 | Lair |
| 6,786,038 B2 | 9/2004 | Lair |
| 6,804,947 B2 | 10/2004 | Le Docte |
| 6,820,410 B2 | 11/2004 | Lair |
| 6,845,607 B2 | 1/2005 | Lair |
| 6,845,946 B2 | 1/2005 | Lair |
| 6,895,742 B2 | 5/2005 | Lair et al. |
| 6,910,328 B1 | 6/2005 | Joyce |
| 6,926,234 B2 | 8/2005 | Colotte |
| 6,938,408 B2 | 9/2005 | Lair |
| 6,945,031 B2 | 9/2005 | Lair |
| 6,966,175 B2 | 11/2005 | Lair |
| 6,968,675 B2 | 11/2005 | Ramlaoui et al. |
| 6,971,229 B2 | 12/2005 | Lair |
| 6,976,352 B2 | 12/2005 | Lair |
| 6,983,588 B2 | 1/2006 | Lair |
| 6,993,819 B2 | 2/2006 | Homann |
| 7,007,454 B2 | 3/2006 | Dehu |
| 7,010,905 B2 | 3/2006 | Lair |
| 7,043,897 B2 | 5/2006 | Osman |
| 7,055,329 B2 | 6/2006 | Martens et al. |
| 7,093,793 B2 | 8/2006 | Lair |
| 7,127,880 B2 | 10/2006 | Lair |
| 7,146,796 B2 | 12/2006 | Lair |
| 7,229,247 B2 | 6/2007 | Durocher et al. |
| 7,255,307 B2 | 8/2007 | Mayes |
| RE39,972 E | 1/2008 | Royalty |
| 2004/0139726 A1 | 7/2004 | Colotte |
| 2005/0151012 A1 | 7/2005 | Lair |
| 2005/0183894 A1 | 8/2005 | Lair |
| 2006/0005530 A1 | 1/2006 | Blin |
| 2006/0288688 A1 | 12/2006 | Lair |
| 2008/0072570 A1 | 3/2008 | Lair |

FOREIGN PATENT DOCUMENTS

WO 86/00862 A1 2/1986

OTHER PUBLICATIONS

U.S. Appl. No. 11/941,360, filed Nov. 16, 2007, entitled "Thrust Reverser Door", by Jean-Pierre Lair.

U.S. Appl. No. 11/941,371, filed Nov. 16, 2007, entitled "Pivoting Door Thrust Reverser for a Turbofan Gas Turbine Engine", by Jean-Pierre Lair.

U.S. Appl. No. 11/941,395, filed Nov. 16, 2007, entitled "Pivoting Fairings for a Thrust Reverser", by Jean-Pierre Lair.

U.S. Appl. No. 11/941,391, filed Nov. 16, 2007, entitled "Thrust Reverser Door", by Jean-Pierre Lair.

U.S. Appl. No. 11/941,388, filed Nov. 16, 2007, entitled "Thrust Reverser", by Jean-Pierre Lair.

* cited by examiner

THRUST REVERSER FOR A TURBOFAN GAS TURBINE ENGINE

TECHNICAL FIELD

The technical field relates to turbofan gas turbine engines that are provided with thrust reversers.

BACKGROUND

Thrust reversers often have a number of fittings installed on their sides for providing, for example, mechanical attachment points for the components of the actuation system, pivot connections for doors, etc.

These fittings, however, require precise positioning, jigs for installation, and thus increase manufacturing time and costs not to mention an increase in the overall part count.

There was thus a need to provide improvements in the design and manufacturing of thrust reversers.

SUMMARY

In one aspect, the present concept provides a thrust reverser extending circumferentially around a longitudinal engine axis, the thrust reverser comprising two opposite substantially rectangular-shaped arms having longitudinally-extending edges providing long sides of said rectangle shape, the arms connected together by two opposite skins extending circumferentially between respective longitudinally-extending edges of the arms, the arms having a plurality of fittings integrally formed in an exterior surface of each arm, the fittings configured to provide attachment points for at least an actuator of the thrust reverser.

In another aspect, the present concept provides a thrust reverser comprising an elongated generally cylindrical body extending around a longitudinal axis, the body having an interior jet pipe surface and an exterior surface, the body comprising at least four longitudinally-extending sections, each of said sections joined to two adjacent sections along longitudinally-extending joints.

In another aspect, the present concept provides a method of manufacturing a thrust reverser jet pipe, the method comprising: machining at least one workpiece to provide a support having integrated fittings on a side thereof; forming at least one skin; assembling the at least one support and the at least one skin to form a substantially cylindrical jet pipe duct of the thrust reverser; joining the at least one support and skin to provide a rigid jet pipe body; and connecting at least one piece of thrust reverser hardware to the integrated fittings, the hardware selected from the group consisting of actuators and latches.

Further details of these and other aspects of the improvements presented herein will be apparent from the detailed description and appended figures.

DETAILED DESCRIPTION

Figure 1:
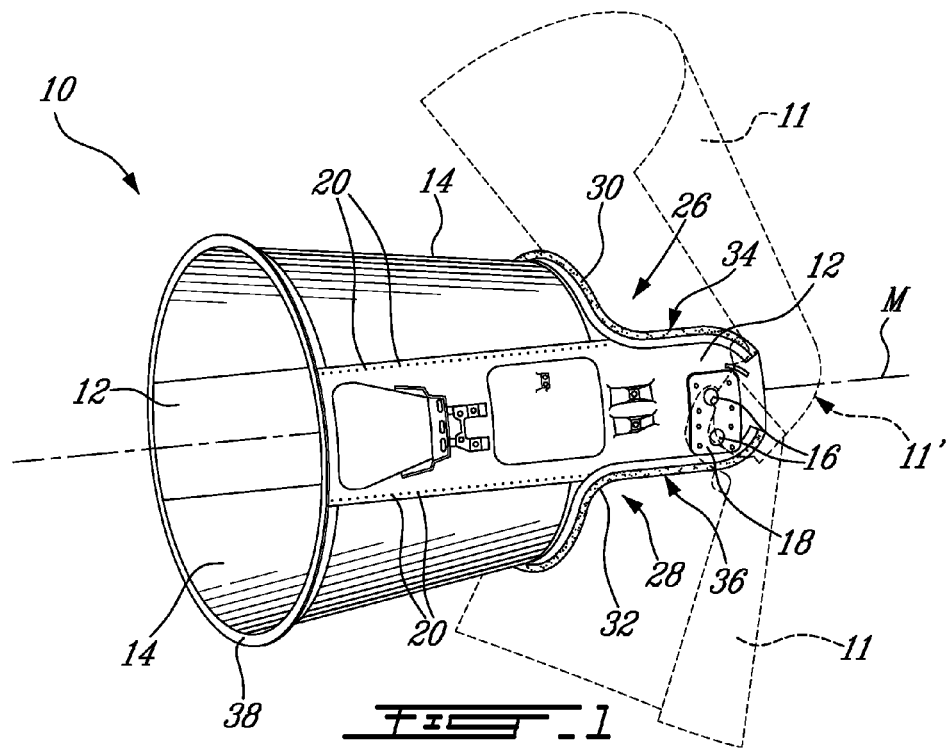
FIG. 1 is an isometric view of an example of a thrust reverser jet pipe.

Referring now to FIG. 1, there is shown an example of a thrust reverser body 10 having two opposite clam-shell type doors 11 (shown in stippled lines, for clarity) that are pivotally connected to the thrust reverser body 10 at a pivot, described later below. FIG. 1 also shows the main longitudinal axis M of the thrust reverser.

When the doors 11 are in a stowed position, their trailing edges 11' are part of an exhaust exit nozzle of the engine nacelle. These doors 11 are moved to a deployed position, (as shown in FIG. 1) when the thrust reverser is activated so as to redirect the engine thrust and provide the aerodynamic decelerating force opposing the forward movement of the aircraft.

The thrust reverser body 10 further comprises five interconnected sections namely two opposite arms 12 (referred to hereafter in the description as the side arms 12), two opposite skins 14 and an attachment flange 38 by which the thrust reverser is connected to an appropriate portion of the engine, such as the exit of a by-pass duct (not shown).

The side arms 12 thus extend from the inlet flange 38 at the leading edge of the thrust reverser body 10 to the door-pivot locations.

When connected together (as discussed further below) along their longitudinally-extending edges, the side arms 12 and the skins 14 form a duct having a substantially circular internal cross section, with the interior surfaces of the side arms 12 being substantially uniform and slightly curved in their transversal direction, as shown.

Flange 38 is connected circumferentially around an upstream lip of the duct. These sections 12, 14 and 38 thus form the structural body 10 for the thrust reverser and a support for the reverser doors 11, while also providing a jet pipe for receiving and directing exhaust thrust from the engine.

As will be discussed further below, the side arms 12 are machined from solid metal, such that all necessary attachment points and other mechanical features are provided integrally on the side arms 12. In this example, the skins 14 are sheet metal or a composite material, while the flange 38 is provided in any suitable manner, such as machining. The construction of the body 10 will be discussed further below.

In the illustrated example, one door 11 will be located and mounted to the thrust reverser body 10 at its upper side and the other door 11 will be located at the lower side, e.g. in a configuration where the doors 11 are movable in a vertical direction. The doors 11 can be pivotally connected to the doors pivots by corresponding arms attached to each door 11.

The door pivots can be attached to the interior of the jet pipe, with the pivots outwardly projecting through a pair of corresponding spaced-apart holes 16 located in a pivot mount section 18 at the rear of each side arm 12 as described in applicant's U.S. co-pending patent application Ser. No. 11/941,371 filed Nov. 16, 2007, the entire contents of which are incorporated herein by reference. Other suitable door-pivot arrangements are also possible.

It should be noted that doors 11 may also be configured with any other suitable orientation, such as with a left door and a right door movable in a horizontal direction. Other suitable arrangements are possible, as well, within the teachings of the present concept.

The side arms 12 and the skins 14 can be attached together by any suitable means, such as by rivets 20 in holes 22 (FIG. 2) provided at the longitudinal edges 24, 25 of the side arms 12. Corresponding holes in the jet pipe skins 14 are registered with the holes 22 in the side arms 12.

It is also possible to join the sections 12, 14 and 38 in any other suitable manner, such as welding, bonding, etc. and a single joining method need not be used throughout (e.g. sections, such as the flange 38 may be welded to the other sections 12, 14 while these other sections are riveted together, etc.)

The rear of the thrust reverser body 10 has upper and lower cutouts 26, 28, resulting from the side arms 12 being longer than the skins 14. Peripheral edges 30, 32 define the cutouts 26, 28, each edge 30, 32 having a substantially horizontal or longitudinal portion and a generally vertical or circumferential portion (which, as the reader will appreciate, are semicircular in shape, extending from the substantially horizontal portion on one side arm 12, to the substantially horizontal portion on the other side arm 12).

Each peripheral edge 30, 32 is shown with corresponding seals 34, 36 along the lengths of the portions, as described in applicant's patent application Ser. No. 11/941,378 filed Nov. 16, 2007, the entire contents of which are incorporated herein by reference. These seals 34, 36 prevent gases from escaping between the thrust reverser body 10 and the doors 11 when the doors 11 are stowed and the engine is running, i.e., when the reverser nozzle is in its direct thrust mode of operation.

Figure 2:
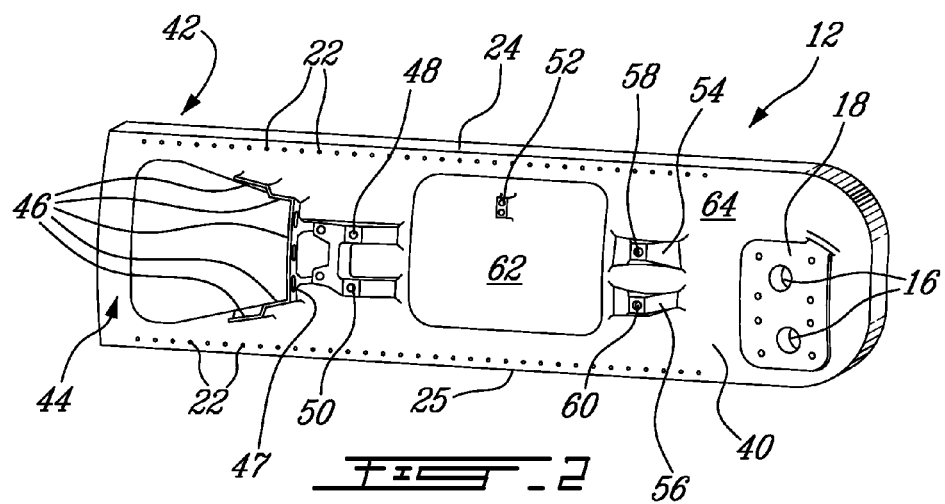
FIG. 2 is an enlarged isometric view of one of the side arms of the thrust reverser jet pipe in FIG. 1 before final machining.

FIG. 2 is an enlarged isometric view of one of the side arms 12 during an intermediate manufacturing step (i.e. before the interior jet pipe surface has been machined, as described further below). The side arm 12 has an elongated body 40 with two opposite circumferential faces 42, 44, the inner circumferential face 42 defining a portion of the interior duct or jet pipe face of the thrust reverser body 10 and the outer circumferential face 44 defining a portion of the exterior surface of the thrust reverser body 10.

As can be seen, the side arm body 40 has a plurality of features 46, 48, 50, 52, 54 and 56 integrally formed on the exterior face 44 of the side arm 12. These features are machined from an initial unitary solid workpiece (not shown), as discussed hereafter. These features are used for attaching thrust reverser components. For example, features 48, 50 provide provision for connection of the forward end of the primary door actuator (not shown) while features 54, 56 provide provision for connection of the aft end of the primary door actuator.

Further in this example, feature 52 is provided for connection of a position switch (not shown).

Multiple features 46 are provided for positioning and/or attachment of other hardware such as door latch actuators, door latches, mechanism springs, latch covers, fairings, etc.

It will be understood that the configuration of features 46-56 will be dictated to some extent by the design of the thrust reverser and the design of the individual hardware components to be attached/positioned, and hence what is presented herein is merely exemplary.

As can be seen FIG. 2, some of the features have an attachment bore, such as bores 58 and 60, which may be internally threaded, or not, depending on the desired function of the bore. Also, at least some of the attachment bores have a central axis that is substantially perpendicular to the main longitudinal axis M of the jet pipe 10.

The features can have any suitable shape(s), as shown for instance in FIGS. 1 and 2. Many of the fittings may have a progressive transition with surrounding portions at the exterior surface of the side arm 12. At least some of the attachment bores may also have an outer edge that is located in a substantially flattened top portion of the corresponding fitting.

Still, some features, such as the feature 52, may have more than one attachment bore and some may include a flanged portion, such as the feature 46. A flanged portion of feature 46 extends in a transversal direction on the exterior surface of the side arm 12. The flanged portion is also provided with holes 47, as illustrated.

Other configurations and arrangements are possible as well, and as mentioned, the design of such features depends on thrust reverser and component designs.

FIGS. 1 and 2 show that at least one of the features—such as feature 52 in the illustrated example—projects radially from a section 62 of the exterior face 44 that is recessed with reference to a nominal outer surface 64 of the side arm 12. The recessed section 62 can be a section on the side arm 12 where a reduced thickness section is structurally possible in order to reduce overall weight without negatively impacting strength or performance, for example.

Figure 3:
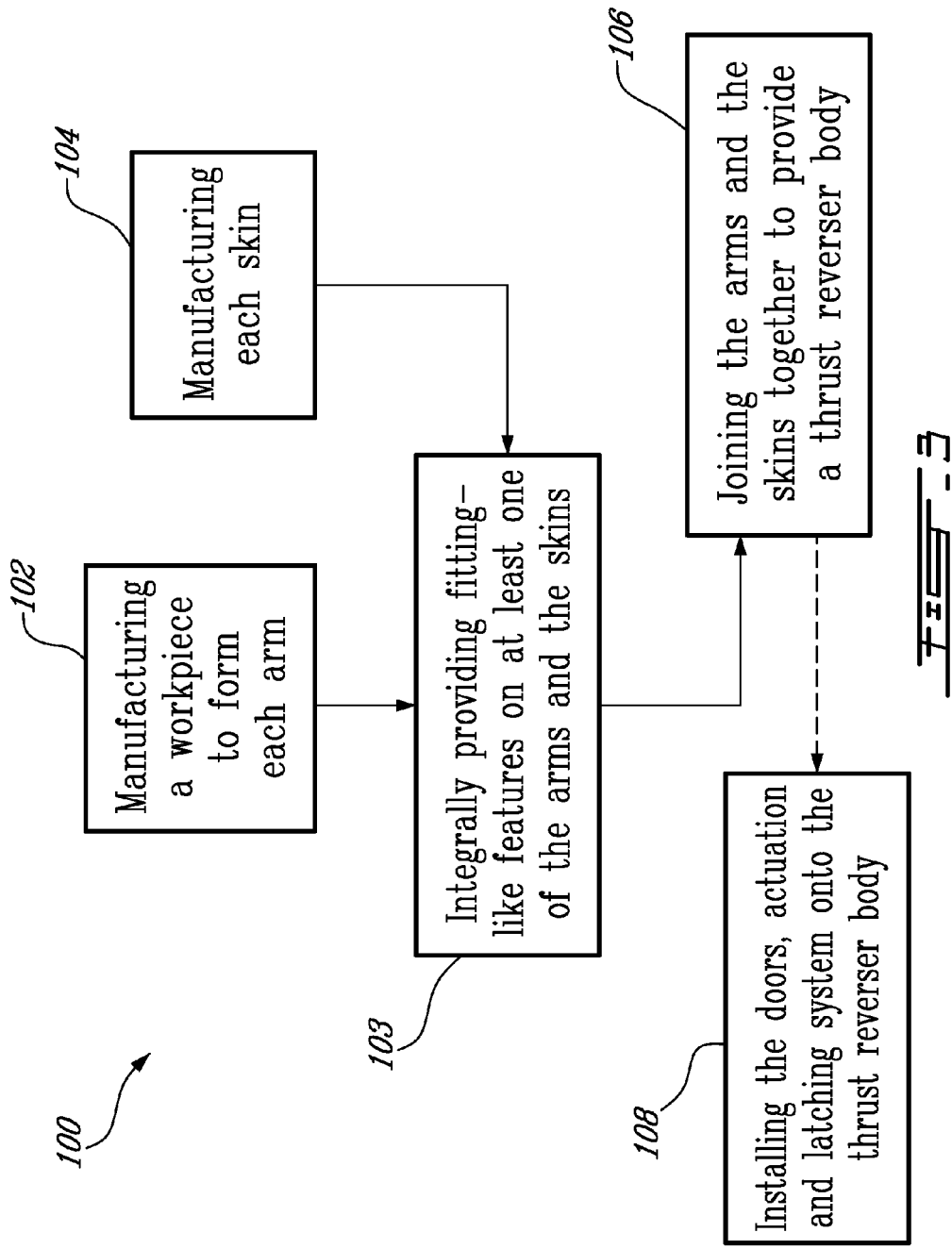
FIG. 3 is a block diagram depicting an example of a method of manufacturing a thrust reverser jet pipe.

FIG. 3 is a block diagram 100 depicting an example of a method of manufacturing a thrust reverser of the type shown in FIGS. 1 and 2.

At step 102, a first and a second workpiece can be provided, for example by machining or other suitable process, to form a first and a second arm 12, respectively. Machining can be done, for instance, in a numerically controlled machine with a solid metal workpiece, or any other suitable machining, forming, molding, etc. approach may be used.

In the case of machined arms 12, the workpiece can be a pre-formed workpiece (e.g. provided, say, by casting, forging, etc.) with some approximately-shaped features already present on what will be the exterior side of each jet pipe arm 12, so as to reduce the amount of material to be removed during machining.

Alternately, the initial workpiece may be a simple rectangular block, with no or little pre-formed shapes. Most of the machining on the exterior side of the jet pipe arms 12 can be done in the same machine, thus without the need of repositioning the workpiece and possibly reduce precision.

At step 103, machining can be carried out to form the fittings/features and their attachment bores for the corresponding components of the thrust reverser actuating system. The same machine can be used for making the holes 22 along the longitudinal edges 24, 25.

If desired, additional machining can also be done in one or more other machines. To reduce tolerance stack-up, preferably additional machining on other machines is used for operations that do not directly relate to the positioning of the hardware on the features/fittings.

For instance, subsequent machining operations on the jet pipe arm 12 can provide weight removal, heat treatment, polishing, surface coatings, etc., which operations would not affect the accuracy of placement of hardware such as actuators, position switches, latches (i.e. as mentioned above) on the trust reverser body 10. The two jet pipe arms 12 need not be identical nor symmetric, but generally will be.

At step 104, the first and the second skins 14 are made of in this example metal sheet or composite materials, using any suitable approach. If desired, each skin 14 can be a subassembly of two or more panels connected together. The two jet pipe skins 14 need not be identical or symmetrical, but generally will be so. Although in this example, the skins 14 are sheet-like and the arms 12 are machined, in another example, any suitable fabrication approach may be used for either.

As depicted at step 106, once the arms 12 and the skins 14 are ready for assembly, they are positioned in a circular configuration with each skin 14 being between the first and the second arms 12. The longitudinal edges of the skins 14 and the longitudinal edges 24, 25 of the arms 12 are then connected together, and to flange 38, as described earlier, to provide the structure of the thrust reverser body 10.

If desired, additional machining can be done on the thrust reverser body 10, once the arms 12, skins 14, and flange 38 are joined to each other, either before or after the installation of the trust reverser on the engine.

As shown at step 108, the thrust reverser doors, fairings, latches, actuators and other hardware are mounted onto the body 10 to provide the final thrust reverser.

The above description is meant to be exemplary only, and one skilled in the art will recognize that changes may be made to the embodiments described without departing from the inventions disclosed.

For instance, the shapes, placements, functions and configurations of the skins, side arms, features/fittings may differ from what is shown and described.

Although fitting/feature locations are described on outer surfaces of the thrust reverser body, the teachings herein may be applied to any suitable surface(s).

Although thrust reverser sections are joined along longitudinally extending seams, any suitable joint shape and configuration may be employed.

What is described above as a single arm 12 may comprise an assembly of arm portions joined together in a suitable manner.

Still other modifications will be apparent to those skilled in the art, in light of a review of this disclosure, and such modifications are intended to fall within the scope of the appended claims.

What is claimed is:

1. A thrust reverser extending circumferentially around a longitudinal engine axis, the thrust reverser comprising two discrete opposite substantially rectangular-shaped arms having longitudinally-extending edges providing long sides of said rectangle shape, the arms connected together by two discrete opposite skins extending circumferentially between respective longitudinally-extending edges of the arms, each of the arms comprising a machined unitary solid body varying in thickness to have a plurality of fittings integrally machined in an exterior surface of each arm, the fittings configured to provide attachment points for at least an actuator of the thrust reverser.

2. The thrust reverser as defined in claim 1, wherein at least some of the fittings include an attachment bore.

3. The thrust reverser as defined in claim 1, wherein each arm includes at least one aperture for receiving a pivot mount for thrust reversing doors of the thrust reverser.

4. The thrust reverser as defined in claim 3, wherein the pivot mount sections are adjacent to a rear end of the arms.

5. The thrust reverser as defined in claim 1, further comprising longitudinally-extending joints extending between the arms and the skins.

6. The thrust reverser as defined in claim 5, wherein the joints are selected from the group consisting of welded joints, brazed joints, riveted joints and bonded joints.

7. The thrust reverser as defined in claim 5, further comprising a circumferential flange joined to a leading edge cooperatively provided by the arms and the skins.

8. The thrust reverser as defined in claim 1, wherein at least one of the fittings on at least one of the arms projects from a section of the exterior side that is recessed with reference to a nominal exterior surface of the arm.

9. The thrust reverser as defined in claim 1, wherein the arms are longitudinally longer than the skins.

10. A thrust reverser comprising:
an elongated generally cylindrical body extending around a longitudinal axis, the body having an interior jet pipe surface and an exterior surface, the body comprising at least four discrete longitudinally-extending sections, each of said sections fixedly joined to two adjacent sections along longitudinally-extending joints; and
at least one of said sections comprising a unitary machined solid arm varying in thickness to provide in the exterior surface a plurality of fittings integrally machined from said arm, said fittings projecting radially outwardly of the arm, at least some of the fittings having a central bore for connecting a thrust reverser component.

11. The thrust reverser as defined in claim 10, wherein at least one of the fittings projects from a recessed portion of the exterior surface of the arm.

12. The thrust reverser as defined in claim 10, wherein the body extends between a first end and a second end, the first end being at a leading edge of a jet pipe, the leading edge having a flange portion joined to the body.

13. The thrust reverser as defined in claim 10, wherein a portion of the arm includes a region of reduced thickness.

14. A method of manufacturing a thrust reverser jet pipe, the method comprising:
machining at least one discrete, unitary, solid workpiece to vary thickness thereof and provide a support having integrated fittings on a side thereof;
forming at least one skin;
assembling the at least one support and the at least one skin to form a substantially cylindrical jet pipe duct of the thrust reverser;
joining the at least one support and skin to provide a rigid jet pipe body; and
connecting at least one piece of thrust reverser hardware to the integrated fittings, the hardware selected from the group consisting of actuators and latches.

15. The method as defined in claim 14, wherein the step of machining includes machining all fittings in a same machine set-up.

16. The method as defined in claim 14, further comprising the step of machining a reduced-thickness weight reduction region in a portion of the at least one support.

17. The method as defined in claim 14, wherein two said supports and two said skins are provided, the step of assembling includes assembling a support between each skin and a skin between each support to thereby provide said duct, the supports and skins meeting along respective longitudinally-extending joints, and the step of joining comprises riveting along said longitudinally-extending joints.

18. The method as defined in claim 17 further comprising the step of joining a circumferential flange to an upstream lip of the jet pipe duct.

19. A thrust reverser comprising:
two discrete side arms disposed circumferentially oppositely apart and each including a machined unitary solid body varying in thickness due to machining thereof to have a plurality of integrally machined attachment fittings extending outwardly therefrom;
two discrete skins disposed circumferentially between said side arms and fixedly joined thereto to collectively form a duct; and
a discrete annular flange fixedly joined to said side arms and said skins to form a structural pipe assembly for precisely supporting thrust reverser doors and actuators therefor.

20. A thrust reverser according to claim 19 wherein said fittings comprise longitudinally spaced apart forward and aft fittings configured for supporting corresponding forward and aft ends of said actuators.

21. A thrust reverser according to claim 20 wherein said fittings comprise a flat pivot mount including a pair of holes for supporting corresponding pivots for said thrust reverser doors.

22. A thrust reverser according to claim 21 wherein said fittings are integrally machined in each of said side arms in common machining reference thereto for precise reference thereon.

23. A thrust reverser according to claim 21 wherein said skins comprise arcuate sheets circumferentially joining said side arms.

24. A thrust reverser according to claim 23 wherein said side arms and skins include corresponding rows of holes fixedly joined together by fasteners therein.

25. A method of making said thrust reverser according to claim 19 comprising:
- separately machining said bodies to precisely form said fittings in said side arms;
- separately forming said skins and flange; and
- assembling and fastening together said side arms, skins, and flange to form said pipe assembly.

* * * * *